US007309835B2

(12) United States Patent
Morrison et al.

(10) Patent No.: US 7,309,835 B2
(45) Date of Patent: Dec. 18, 2007

(54) ADJUSTABLE SPEED DRIVE/VARIABLE FREQUENCY DRIVE CABLE, CONNECTOR AND TERMINATION SYSTEM

(75) Inventors: Gary L. Morrison, South Point, OH (US); Lee Perry, Culloden, WV (US); Rick Sperry, Huntington, WV (US)

(73) Assignee: Service Wire Company, Culloden, WV (US)

( * ) Notice: Subject to any disclaimer, the term of this patent is extended or adjusted under 35 U.S.C. 154(b) by 0 days.

(21) Appl. No.: 11/560,491

(22) Filed: Nov. 16, 2006

(65) Prior Publication Data

US 2007/0107921 A1 May 17, 2007

Related U.S. Application Data

(60) Provisional application No. 60/737,096, filed on Nov. 16, 2005.

(51) Int. Cl.
*H02G 15/02* (2006.01)

(52) U.S. Cl. ..................... 174/74 R; 174/77 R; 174/78

(58) Field of Classification Search .................. 174/36, 174/102 R, 106 R, 113 R, 116, 108, 74 R, 174/77 R, 78, 79, 82, 84 R
See application file for complete search history.

(56) References Cited

U.S. PATENT DOCUMENTS 2,286,827 A * 6/1942 Morrison .................... 174/103
2,355,403 A * 8/1944 Tripp ......................... 174/669
2,446,387 A * 8/1948 Peterson ............... 174/105 SC
2,621,703 A * 12/1952 Morrison ...................... 156/51
2,858,358 A * 10/1958 Hawke ........................ 174/89
2,953,627 A * 9/1960 Malneritch et al. ...... 174/102 R
3,526,871 A * 9/1970 Hobart ....................... 439/584
3,699,238 A * 10/1972 Hansen et al. .............. 174/115
3,773,109 A * 11/1973 Eberline .................. 340/855.1
3,833,754 A * 9/1974 Philibert ..................... 174/653
4,002,820 A * 1/1977 Paniri et al. ................ 174/115
4,331,374 A * 5/1982 Phillips ...................... 439/584
4,398,058 A * 8/1983 Gerth et al. ............ 174/106 D
4,491,685 A * 1/1985 Drew et al. ............... 174/75 C
4,600,806 A * 7/1986 Beretta ................... 174/121 A
4,738,636 A * 4/1988 Bolante ...................... 439/462
5,280,137 A * 1/1994 Ward .................... 174/120 SR
6,310,286 B1 * 10/2001 Troxel et al. ................. 174/36
7,166,802 B2 * 1/2007 Cusson et al. .......... 174/113 R
2003/0168242 A1 * 9/2003 Whidden ................ 174/113 R

* cited by examiner

*Primary Examiner*—William H. Mayo, III
(74) *Attorney, Agent, or Firm*—Monika J. Hussell; Dinsmore & Shohl LLP

(57) ABSTRACT

A cable and termination system for use with adjustable speed drives, including flexible tray cables and metal-clad cables, and terminations coupled therewith. The cables generally include three phase conductors, three ground conductors and fillers, and are wrapped with copper tape and other elements. The terminations coupled with the cables include a plurality of connectors and flexible, tinned-copper braids which act as the shield termination for the copper tape. More detailed and other embodiments of the present invention are disclosed in the specification hereof.

14 Claims, 8 Drawing Sheets

ADJUSTABLE SPEED DRIVE/VARIABLE FREQUENCY DRIVE CABLE, CONNECTOR AND TERMINATION SYSTEM

GENERAL BACKGROUND

The product of the present invention is a cable and termination system designed for Adjustable Speed Drives (ASDs, also called Variable Frequency Drives), which system supplies power from a power junction box to an ASD motor control center, as well as providing a low-impedance ground path for common mode (stray) currents generated by ASDs. Due to their high-carrier frequency and smaller pulse rise times, ASDs generate unwanted stray currents that can damage the drive, its motor bearings and insulation, or nearby equipment if those stray currents are not returned properly to the source. The traditional grounding conductor included in ordinary cable is not able to offer a low impedance path for stray currents at high frequencies. Furthermore, asymmetrical phase conduction inherent in ASD designs also requires multiple, geometrically placed grounding conductors (one per phase) for conducting low frequency noise. Internal vibrations of the drive and motor assembly also impact the long-term connection viability of the cable and termination.

The product of the present invention includes cable designs (as detailed below) with alternative termination means. The insulation of the phase conductors within the cable core of the present invention is designed to withstand two to three per-unit transient voltage stress imposed on the cable due to reflected waves of low pulse rise time ASDs. The termination of the present invention is designed for simple, yet effective field installation of the cable to each of the motor control center of the ASD and to the junction box, providing long-term reliability in normal operating conditions.

As hereinafter described, Flexible Tray Cables (TC) constructed and terminated in accordance with the present invention are suitable for existing installations where conduit pre-exists; Metal-Clad Cables (MC) constructed and terminated in accordance with the present invention achieve more consistent lower impedance over a broad spectrum of currents, and are preferred for new installations.

BRIEF SUMMARY

Generally, the present invention is a cable and termination system, wherein the cable has three insulated phase conductors, with each phase conductor being a soft drawn tinned or bare copper conductor; three ground conductors, the ground conductors collectively having a total cross-section of at least one-half of the cross-section of a phase conductor and being a soft drawn tinned or bare copper conductor; and filler. The phase conductors are either positioned to be in contact with two of the conductors (hereinafter described as an MC Cable), or in continuous contact with the copper tape (hereinafter described as a Tray Cable). Wrapped around the cable core is a cable wrap, including copper tape, applied helically over the cable core or any binding tape, with an overlap of fifty percent, and an overall jacket.

The termination which forms an integral part of the present invention includes a plurality of connectors and tinned-copper braids, where the braids are secured about the copper tape of the cable core.

DETAILED DESCRIPTION

Figure 1:
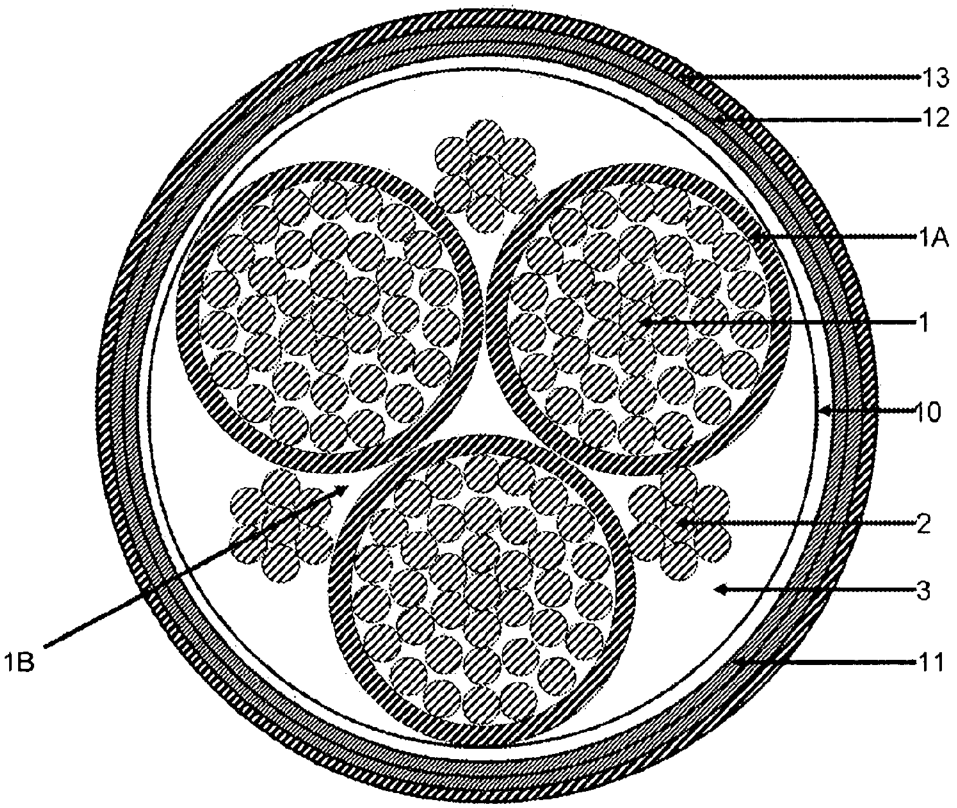
FIG. 1 is a cross section of an embodiment of the MC Cable of the present invention.

MC Cable (Depicted in FIG. 1):

As shown in FIG. 1, the cable core of the MC cable of the present invention is comprised of three phase conductors 1, three ground conductors 2, and filler 3. Each ground conductor 2 corresponds with one of the phase conductors 1, respectively, and is in intimate contact with that conductor and a second conductor. Each phase conductor 1 is a soft-drawn tinned or bare copper conductor, preferably Class B stranded, satisfying the standards identified by ASTM International as ASTM B3-01 and B8-04, with a cross-linked polyethylene type XHHW-2 insulation 1A suitable for use in 600 Volt applications as 90° C. Wet and Dry rated, and having a gauge size ranging from about #16 AWG to 1,000 Kcmil. Collectively, the ground conductors 2 have a total cross-section of at least one-half of the cross-section of a phase conductor 1, and are each a soft drawn, tinned or bare copper conductor, preferably Class B stranded, satisfying the standards identified by ASTM International as ASTM B3-01 and B8-04. In addition, suitable fillers 3 (e.g. flame retardant paper and poly) are interspersed within the cable core design to force the ground conductors 2 into symmetrical, geometric location with their corresponding phase conductor 1 and a second phase conductor, within the grooves 1B between the phase conductors 1, as shown in FIG. 1.

The MC cable further comprises (a) a layer of binder tape 10 of suitable material (such as Mylar), tightly applied over the cable core to maintain the geometry thereof; (b) a layer of smooth copper tape 11, preferably having a thickness between 3 and 5 mil, applied helically over the layer of binder tape with an overlap of fifty percent, which serves to provide a primary (low-impedance, low-resistance) shield for the cable; and (c) an interlocking strip of galvanized steel armor 12, applied in continuous contact with, and complete coverage over, the copper tape shield 11, with suitable tightness to prevent core slippage. The overlap of the copper tape 11 ensures at least double tape thickness at all points in the cable, and facilitates shield effectiveness even if the cable is flexed or bent (which may otherwise lead to shield separation). The galvanized steel armor 12 acts as a suitable secondary (low-impedance) path for high frequency noise conduction for the cable. Finally, the MC cable comprises an overall jacket 13 of suitable material (such as polyvinylchloride or, more preferably for its low smoke qualities, polyolefin) for the application in question, as would be known by a person skilled in the relevant art of cable construction and design. Optionally, an inner jacket (not shown) of material similar to that of the outer jacket 13 may be applied between the binder tape 10 and the copper shield 11 if improved moisture resistance is desirable.

Figure 3:
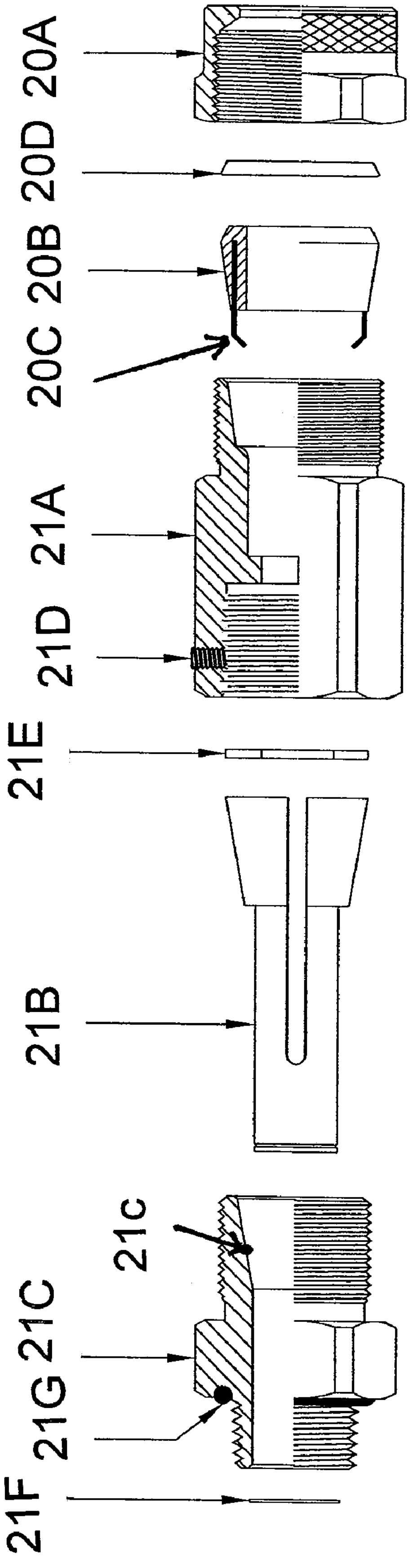
FIG. 3 shows an embodiment of the shield/armor termination of the MC Cable of the present invention, showing components separated but in assembly order, with the top half of some components showing the interior structure thereof.
Figure 4:
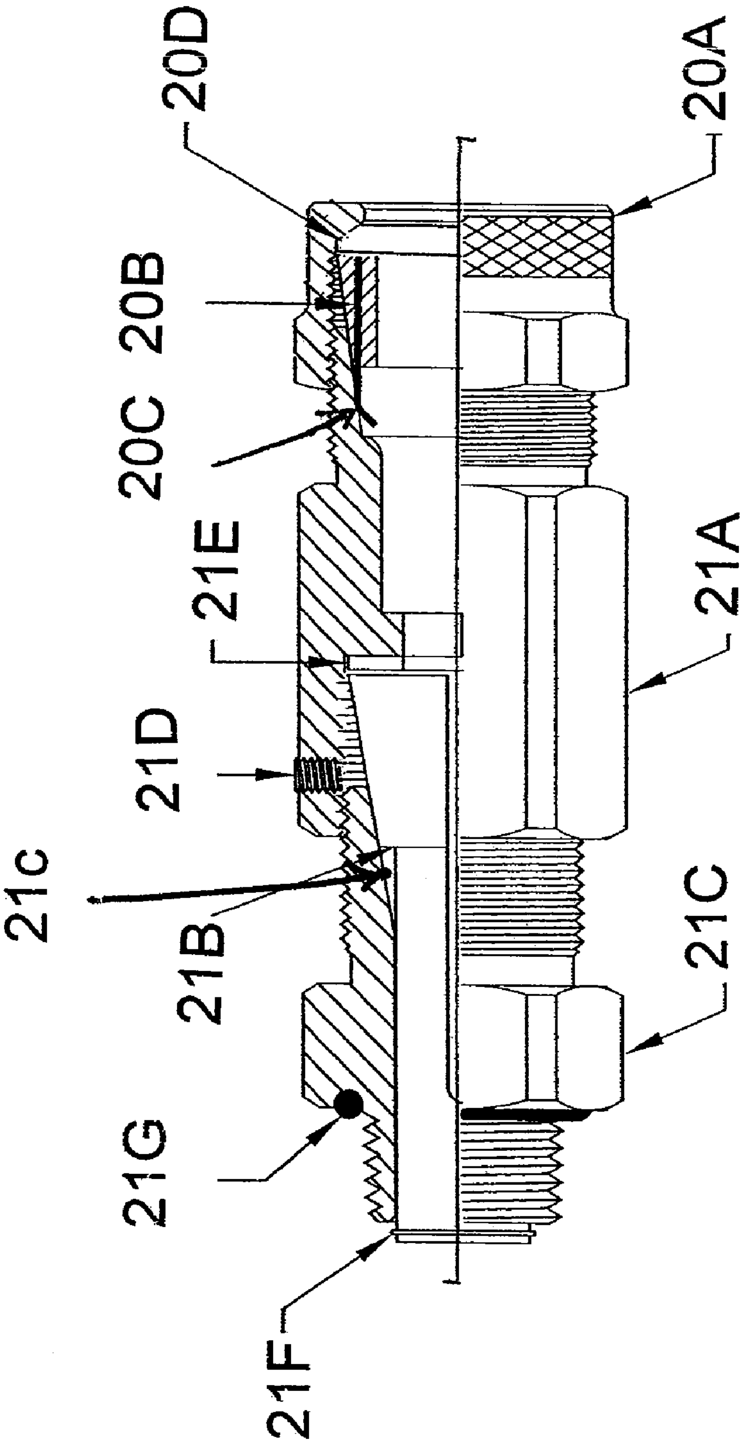
FIG. 4 shows the embodiment of FIG. 3, showing the components assembled, with the top half of some components showing the interior structure thereof.
Figure 5:
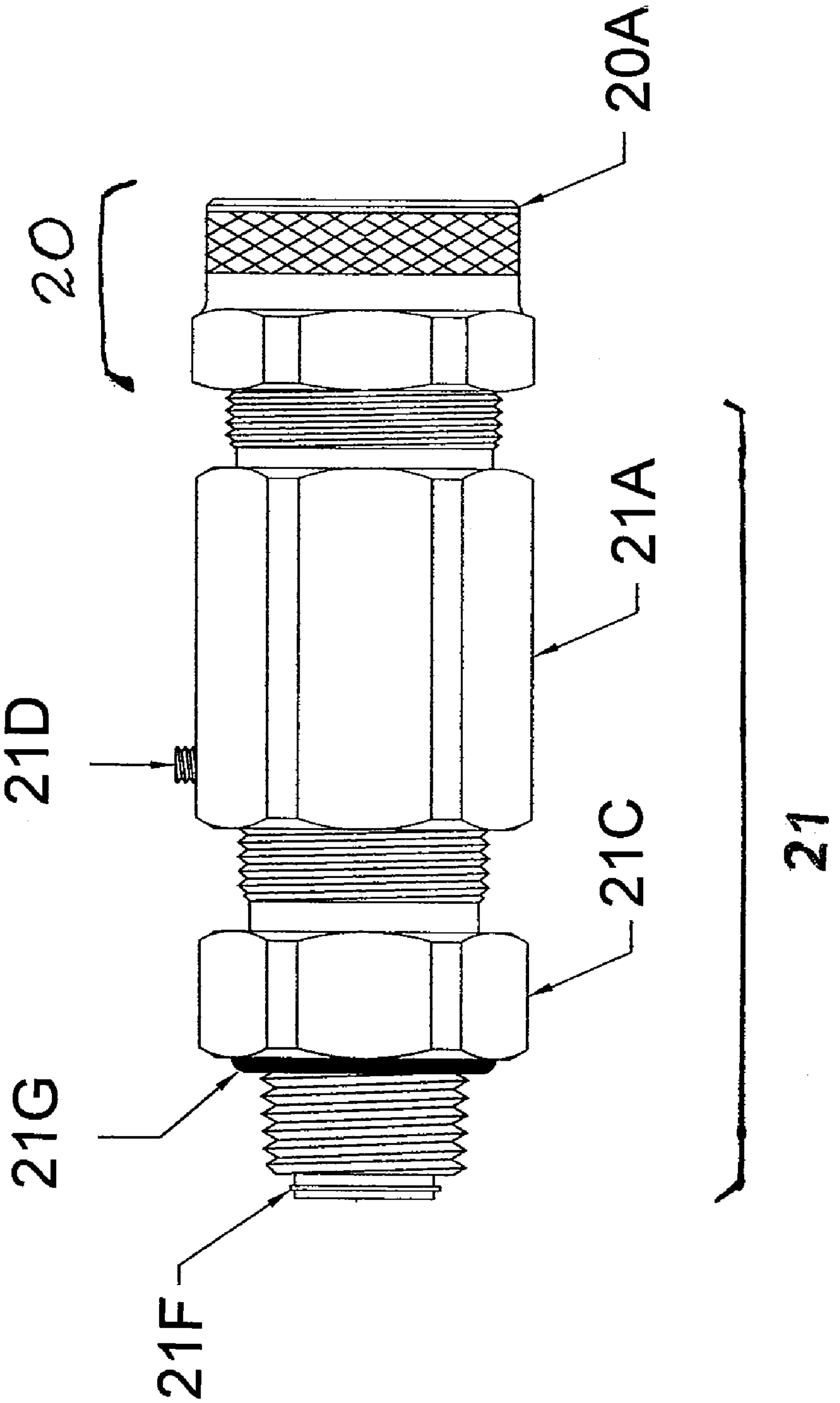
FIG. 5 is an exterior view of the embodiment in FIG. 4.

MC Cable Shield/Armor Termination (Depicted in FIGS. 3-5):

As depicted in FIGS. 3-5, a preferred embodiment of the shield/armor termination for each end of the MC cable of the present invention described above comprises a first connector 20 suitable for use with MC cables, comprising a standard connector 20A and a rubber grounding seal 20B with stainless steel fingers or tines 20C. Preferably, a compression washer 20D is coupled within the connector 20 to allow a tighter coupling of the termination means.

The termination further comprises a second, reverse-threaded, multi-part connector or throat 21, preferably comprising an exterior metal body 21A with set-screws 21D and an anti-friction washer 21E; the multi-part connector or throat 21 further comprising a male metal body 21C having an angled throat 21*c*, and being coupled with a collet sleeve 21B.

Figure 8:
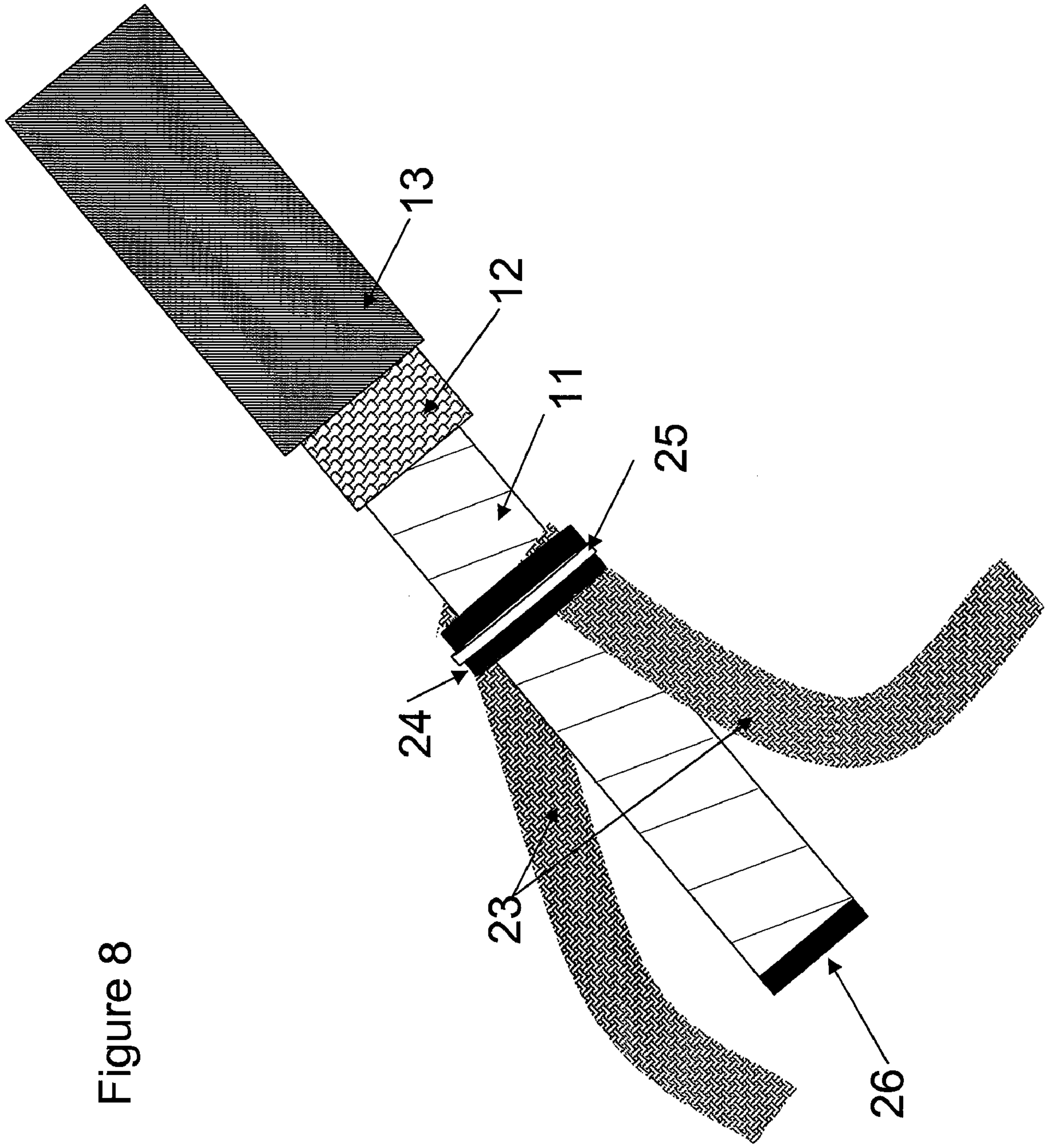
FIG. 8 shows the braids of the shield termination of the MC Cable, as affixed to the cable in an embodiment of the MC Cable of the present invention.

Finally, the shield termination for the MC cable of the present invention described above comprises a plurality of flexible, tinned-copper braids 23 (preferably two), having equal widths that collectively will cover at least one-quarter of the circumference of the cable core, positioned equidistantly about the circumference of the cable core. As shown in FIG. 8, one end of each of the braids 23 is secured to the copper shield 11 between the end of the cable and the beginning of the second conductor 21; the opposing end of the braids 23 is grounded by securing the same to the motor control center case or the motor junction box case, as applicable. Adhesive backed copper tape 24 may be wrapped around the core, over said braids 23, to hold the same in place, over which a stainless steel spring tension clamp or similar clamping means 25 is secured, followed preferably by a second layer of adhesive copper tape. The braid length should be kept as short as possible, free of kinks or breaks.

In use, an end of the cable is slid into the knockout (or entry of the case) of the motor control center or motor junction box, as applicable, and at this end the jacket 13 of the cable is stripped back from the connection point of the ASD or power supply, as applicable, to the point of entry at the knockout. Once the jacket 13 has been stripped, the armor 12 is unlocked to near the beginning of the stripped-back jacket 13. The conductors to be connected to the ASD/power supply or the grounding lug, as applicable, extend independent of the filler and wrap beyond the cable core a sufficient distance to allow connection of the same. Electrical tape 26 is preferably applied to the end of the cable core to ensure that the copper tape shield 11 is secured and will not unravel; this also will serve to reduce cross-talk with other cables within the same enclosure. Next, the interior of the first connector 20 and the exterior metal body 21A of the second connector 21 are preferably measured with set screws to ensure that, when connected as hereinafter described, the rubber portion of the grounding seal 20B of the first connector will be positioned to cover the jacket 13 of the cable core, while the tines 20A grasp the exposed interlocked armor 12. The first connector 20 is then slid onto the cable outside of the motor control center or motor junction box, and the cable is inserted into the knockout. The exterior metal body 21A and the male metal body 21C with collet sleeve 21B of the second connector 21, are slid onto the cable from inside of the knockout. The exterior metal body 21A is then threaded onto the first connector 20, which when positioned correctly as hereinbefore described will force the tines 20A to grasp the interlocked armor 12 of the cable. Next, the male metal body/collet 21B, C is threaded onto the exterior metal body 21A, so that the collet 21B compresses on the copper tape shield 11, but not on the armor 12. Then the set screws 21D on the exterior metal body 21A are tightened, which will lock to the threads of the exterior metal body 21A so that the connector 21 will not slip under vibration. In some embodiments of the present invention, a wave washer or snap ring 21F is snapped onto the end of the male metal body 21C to secure the collet sleeve 21B within the second connector 21. In some embodiments, an O-ring 21G and a locknut with plastic or metallic bushing may be threaded to the exposed end of the male metal body 21B. Once the termination is in place on the cable, the phase conductors 1 are coupled with the drive or motor, and the ground conductors 2 are coupled with the grounding lug of the drive/motor, as applicable.

Figure 6:
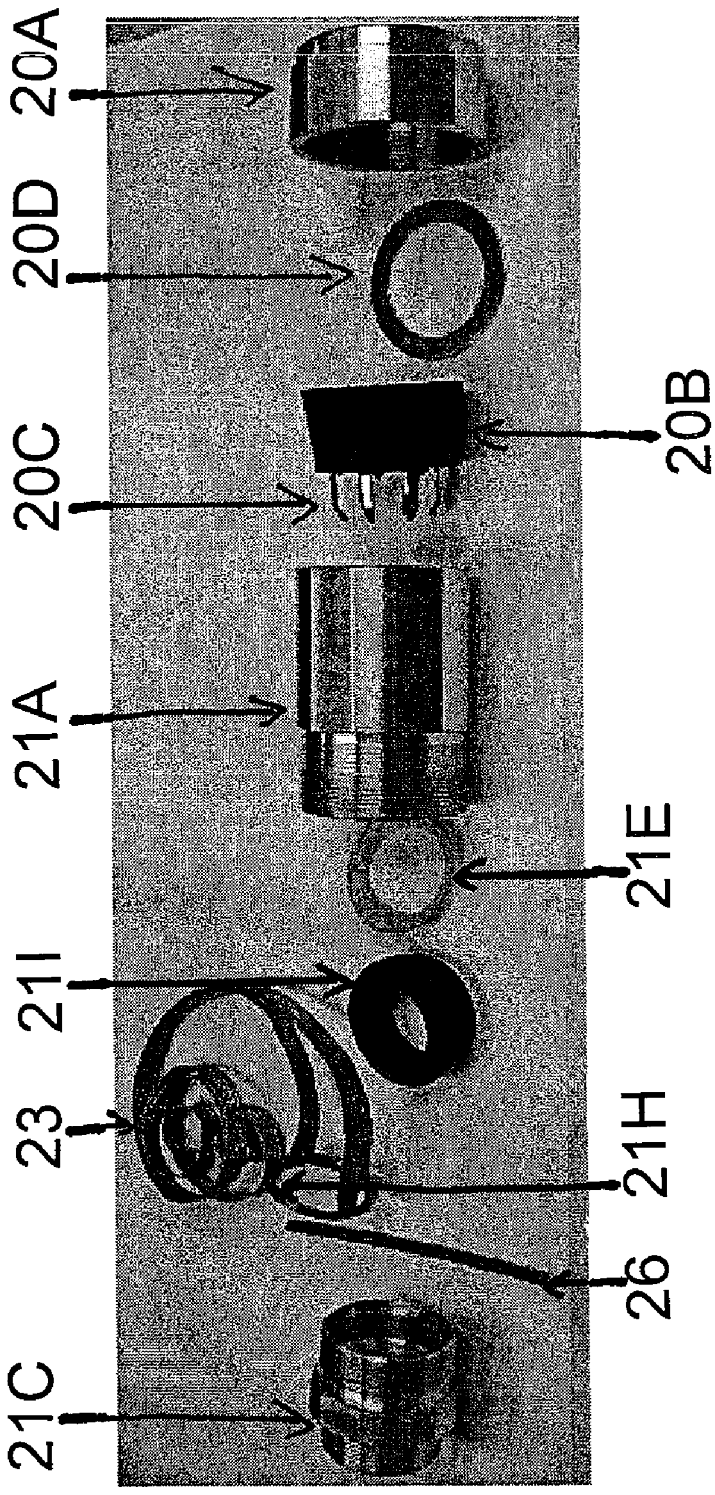
FIG. 6 shows another embodiment of the shield/armor termination of the MC Cable of the present invention, showing the components separated but in assembly order.
Figure 7:
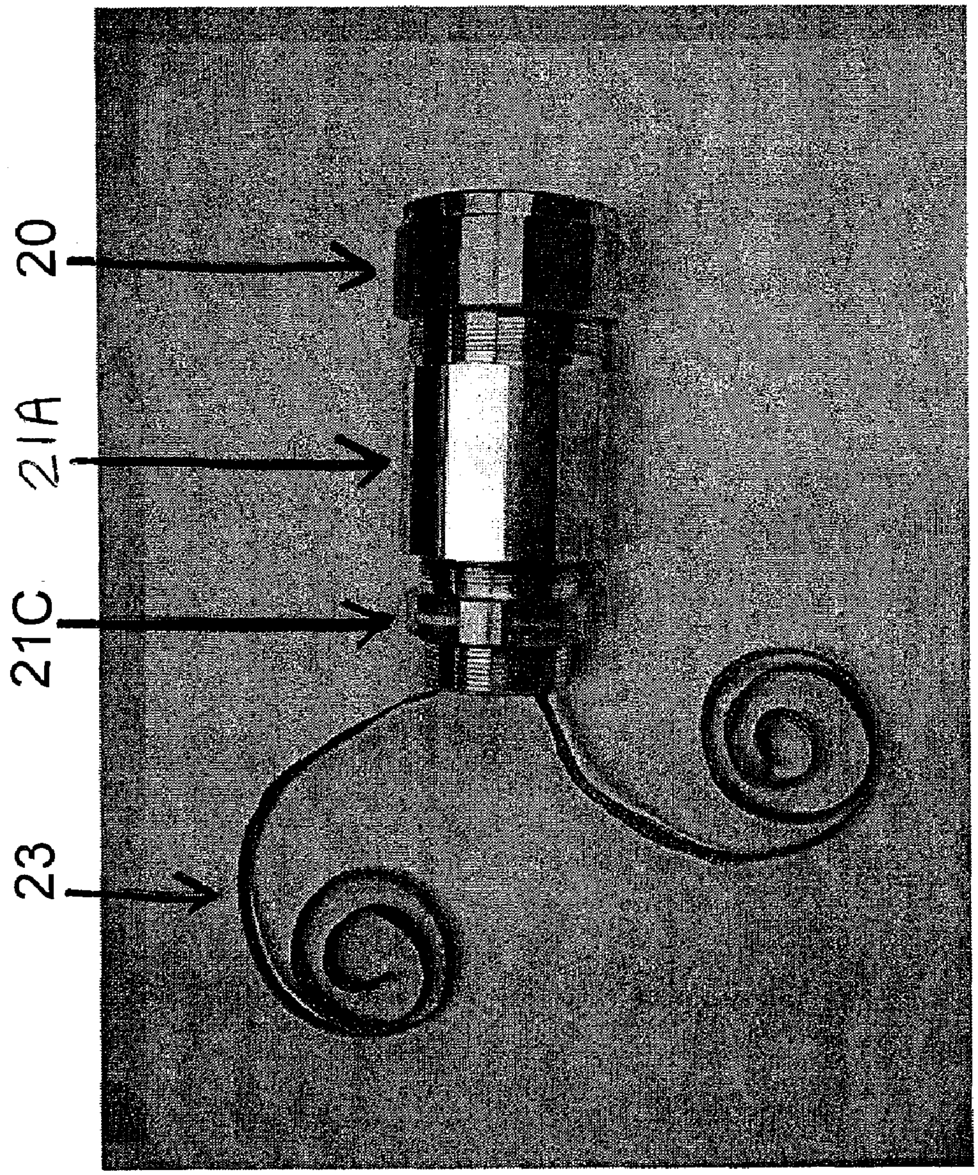
FIG. 7 shows the embodiment of FIG. 6, showing the components assembled.

MC Cable Shield/Armor Termination Alternate (Depicted in FIGS. 6-7):

As shown in FIGS. 6-7, A second preferred embodiment of the shield/armor termination for the MC cable of the present invention is similar to the first described above; however, incorporated at a first end of the male metal body 21C of the second conductor 21 is a spring 26 in lieu of the collet sleeve 21B, located in a "neck-down" position. The braids 23 are affixed to a metal ring 21H which is configured to be incorporated within the male metal body 21C. Further, an additional washer 21I is configured to be incorporated within the exterior metal body 21A. The shield 11 is terminated by tightening the male metal body 21C to the exterior metal body 21A, which causes the washers 21G and 21I to compress against the spring 26 and the ring 21H, forcing the spring 26 into intimate contact with the copper shield 11 (and the ring 21H into intimate contact with the spring 26). The braids 23 exit the second end of the male metal body 21C, preferably without kinks or folds, with equidistant spacing about the cable core, and are grounded by securing the same to the motor control center case or the junction box case, as applicable.

Figure 2:
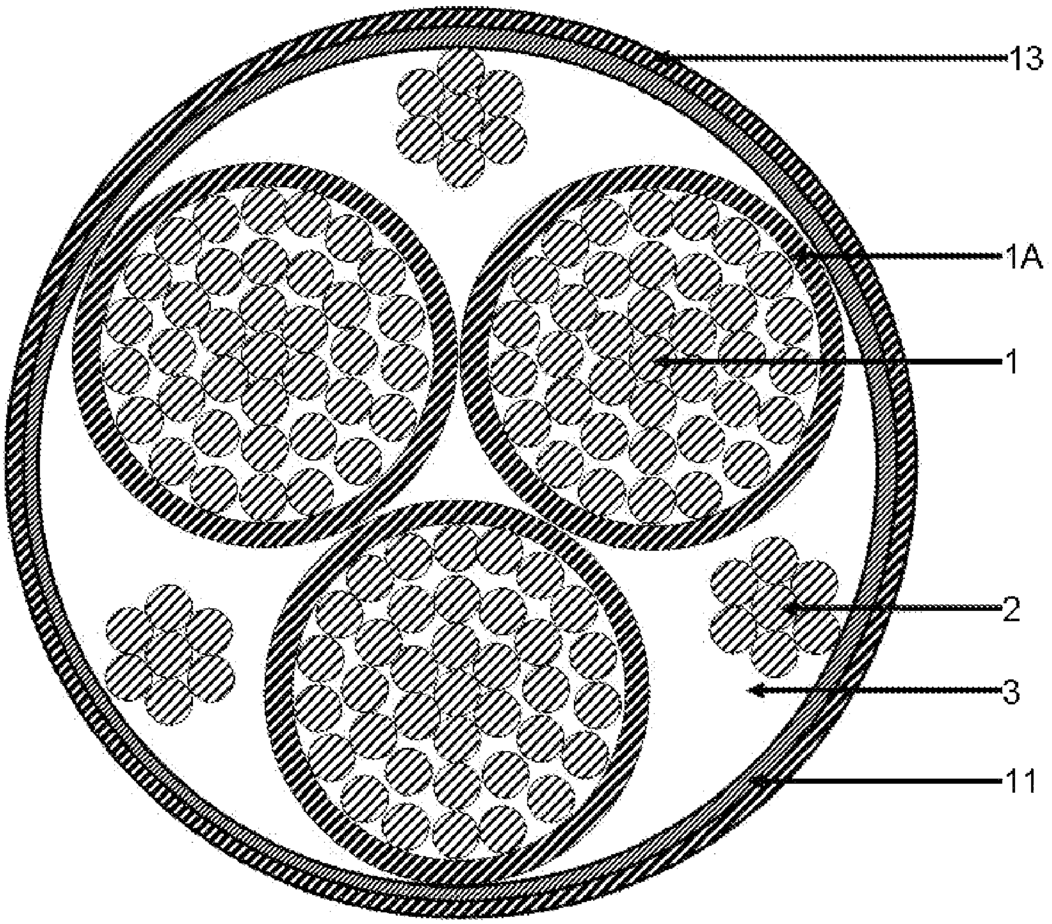
FIG. 2 is a cross section of an embodiment of the TC Cable of the present invention.

Tray Cable (Depicted in FIG. 2):

As shown in FIG. 2, like the MC cable of the present invention, the cable core of the tray cable is comprised of three insulated phase conductors 1, three ground conductors 2, and filler 3; helically wrapped around the tray cable core is copper tape 11 (with an overlap of fifty percent) and a jacket 13. However, the filler 3 in the core of the tray cable is used to force the ground conductors 2 into continuous contact with the copper tape 11, equidistantly spaced at the exterior of the cable core, rather than in the grooves between the phase conductors. Furthermore, unlike the MC cable of the present invention, the tray cable does not include layers of binder tape or galvanized steel armor, as this design is intended for installation into pre-existing galvanized conduit.

Tray Cable Shield Termination:

Embodiments of the shield termination of the TC cable of the present invention may be substantially similar to the shield/armor termination of the MC Cable, and generally comprises a first connector 20, suitable for use with TC cables, comprising a standard connector and rubber grounding seal 20B without stainless steel fingers or tines. The termination further includes a second, reverse-threaded connector 21, comprising a male metal body 21C coupled with a collet sleeve 21B or spring 21H (as hereinbefore described), and may comprise an exterior metal body 21A. As with the MC Cable shield termination, the shield termination for the TC cable of the present invention comprises a plurality of flexible, tinned-copper braids 23, having equal widths so that collectively will cover at least one-quarter of the circumference of the cable core, and positioned equidistantly about the cable core. These braids may be secured to the copper shield by means of adhesive backed copper tape 24 and a spring tension clamp 25, or by means of the metal ring/spring design as hereinbefore described.

Overall Design:

Using standard cable design techniques, the cable phase conductors 1 of the present invention may be sized for specific drive applications based on NEC standards (ampacity, voltage drop, etc.). The sizing of the cable phase conductors 1 pre-selects the grounds 2 size, as hereinabove described. In addition, economic issues may dictate the choice between bare and tinned conductors and grounds, as tinned conductor grounds are easier to solder, but bare conductors/grounds are less expensive. Finally, shield termination spring-tension clamps, termination/armor connector size, and braid width are selected based on the overall diameter of the cable core.

In testing, your inventors found that the use of a plurality of braids (with the shortest length possible), in conjunction with a termination kit, reduced attenuation; the testing was performed by a simplified insertion loss measurement using a 50 ohm termination impedance. The testing found that with 12 inches of #6 AWG flat tinned copper braid leads, attenuation was 2.33 dB at 30 MHz; with 24 inches of #8 AWG braid, through 18 inches of cable, attenuation was 4.7 dB at 30 MHz; with 12 inches of #8 AWG braid, through 18 inches of cable, attenuation was 2.07 dB at 30 MHz; and with the addition of one additional #8 AWG braid, 12 inches, through 18 inches of cable, the attenuation was reduced to 1.6 dB at 30 MHz.

Furthermore, the use of multiple layers of tape in conjunction with a spring tension clamp, as hereinbefore described as a preferred embodiment for the MC cable termination, performed better than the clamp alone, or with a single layer of adhesive copper tape, as shown in the following table, with test (1) having current injected across shield ground braid held in place with a clamp; test (2) having current injected across shield ground braid held in place with a clamp plus one 3 mil thick wrap; test (3) having current injected across shield ground braid held in place with a clamp over a single 3 mil thick wrap holding the braid in place; and test (4) having current injected across shield ground braid held in place with the clamp plus two 3 mil thick tape wraps. In all cases amperes were applied from a 12 volt battery.

| Amperes applied | (1) | (2) | (3) | (4) |
|---|---|---|---|---|
| 10 A | 16.25 mV | 12.25 mV | 11.45 mV | 11.4 mV |
| 3 A | 4.82 mV | 3.68 mV | 3.47 mV | 3.43 mV |

In an embodiment, the cable design of the present invention is manufactured in a uniform color, to distinguish it from other cables. Your inventors prefer the color purple.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A cable and termination system, comprising a) a cable comprising a cable core and cable wrap, i) said cable core comprising three insulated phase conductors, each phase conductor being a soft drawn tinned or bare copper conductor, three ground conductors, the ground conductors collectively having a total cross-section of at least one-half of the cross-section of a phase conductor and being a soft drawn tinned or bare copper conductor, and filler;

wherein each ground conductor corresponds with one of the phase conductors, respectively, and is in intimate contact with that phase conductor and a second phase conductor; and wherein the filler is interspersed within the cable core to force the ground conductors into symmetrical, geometric location with their corresponding phase conductor and a second phase conductor; and ii) said cable wrap comprising:

binder tape, applied over said cable core, copper tape, applied helically over the layer of binder tape, with an overlap of fifty percent, an interlocking strip of armor, applied over said copper tape, and an overall jacket; and b) a termination comprising:

a first connector coupled with a rubber grounding seal having metal tines, a second, reverse-threaded connector comprising an exterior metal body and a male metal body coupled with a collet sleeve, said exterior male metal body being configured to attach to said first connector and said male metal body, and a plurality of tinned-copper braids secured about said copper tape of the cable core.

2. The cable and termination system of claim 1, wherein said cable wrap further comprises an inner jacket of moisture resistant material applied between the binder tape and the copper tape.

3. The cable and termination system of claim 1, wherein each phase conductor is Class B stranded, has a gauge size ranging from #16 AWG to 1,000 Kcmil, and is insulated with cross-linked polyethylene XHHW-2 insulation, said armor is manufactured from galvanized steel, and said jacket is selected from the group consisting of polyvinylchloride and polyolefin; and further comprising a spring tension clamp for securing the braids about the copper tape of the core.

4. The cable and termination system of claim 1, wherein said braids are equally sized to collectively cover at least one-quarter of the circumference of the cable core, and are equidistantly spaced about the cable core.

5. A cable and termination system, comprising a) a cable comprising a cable core and cable wrap, i) said cable core comprising three insulated phase conductors, each phase conductor being a soft drawn tinned or bare copper conductor, three ground conductors, the ground conductors collectively having a total cross-section of at least one-half of the cross-section of a phase conductor and being a soft drawn tinned or bare copper conductor, and filler;

wherein each ground conductor corresponds with one of the phase conductors, respectively, and is in intimate contact with that phase conductor and a second phase conductor; and wherein the filler is interspersed within the cable core to force the ground conductors into symmetrical, geometric location with their corresponding phase conductor and a second phase conductor; and ii) said cable wrap comprising:

binder tape, applied over said cable core, copper tape, applied helically over the layer of binder tape, with an overlap of fifty percent, an interlocking strip of armor, applied over said copper tape, and an overall jacket; and b) a termination comprising:

a first connector coupled with a grounding seal having metal tines, a second, reverse-threaded connector comprising an exterior metal body and a male metal body, said exterior metal body being configured to attach to said first connector and said male metal body, said male metal body coupled with a spring, and a plurality of tinned-copper braids secured to a metal ring, sized to be received by said male metal body, wherein said spring of the male metal body, when in position on the copper tape of the cable core, is in intimate contact with said ring.

6. The cable and termination system of claim 5, wherein said cable wrap further comprises an inner jacket of moisture resistant material applied over the binder tape.

7. The cable and termination system of claim 5, wherein each phase conductor is Class B stranded, has a gauge size ranging from #16 AWG to 1,000 Kcmil, and is insulated with cross-linked polyethylene XHHW-2 insulation, said armor is manufactured from galvanized steel, and said jacket is selected from the group consisting of polyvinylchloride and polyolefin.

8. The cable and termination system of claim 5, wherein said braids are equally sized to collectively cover at least one-quarter of the circumference of the cable core, and are equidistantly spaced about the cable core.

9. A cable and termination system, comprising a) a cable comprising a cable core and cable wrap, i) said cable core comprising three insulated phase conductors, each phase conductor being soft drawn tinned or bare copper conductor, three ground conductors, the ground conductors collectively having a total cross-section of at least one-half of the cross-section of a phase conductor and being a soft drawn tinned or bare copper conductor, and filler;

ii) said cable wrap comprising:

copper tape, applied helically over said core with an overlap of fifty percent, and an overall jacket; and wherein each ground conductor of the cable core is in contact with the copper tape; and wherein the filler is interspersed within the cable core to force the ground conductors in equidistant positions within the cable core and in contact with the copper tape; and b) shield termination means comprising a plurality of connectors, the first being coupled with a rubber grounding seal, and the second being coupled with a collet sleeve, and a plurality of tinned-copper braids configured to be secured about the copper tape of the cable core.

10. The cable and termination system of claim 9, wherein each phase conductor is Class B stranded has a gauge size ranging from #16 AWG to 1,000 Kcmil, and is insulated with cross-linked polyethylene XHHW-2 insulation, said jacket is selected from the group consisting of polyvinylchloride and polyolefin.

11. The cable and termination system of claim 9, wherein said braids are equally sized to collectively cover at least one-quarter of the circumference of the cable core, and are equidistantly spaced about the cable core.

12. A cable and termination system, comprising a) a cable comprising a cable core and cable wrap, i) said cable core comprising three insulated phase conductors, each phase conductor being soft drawn tinned or bare copper conductor, three ground conductors, the ground conductors collectively having a total cross-section of at least one-half of the cross-section of a phase conductor and being a soft drawn tinned or bare copper conductor, and filler;

ii) said cable wrap comprising:

copper tape, applied helically over said core with an overlap of fifty percent, and an overall jacket; and wherein each ground conductor of the cable core is in contact with the copper tape; and wherein the filler is interspersed within the cable core to force the ground conductors in equidistant positions within the cable core and in contact with the copper tape; and b) shield termination means comprising a plurality of connectors, one being coupled with a rubber grounding seal, and another being coupled with a spring configured to be received by said connector and when so received, to be in intimate contact with said copper tape of the cable core, and a plurality of tinned-copper braids secured to a metal ring, sized to be received by the connector coupled with the spring, wherein said spring, when in position on the copper tape of the cable core, is in contact with said ring.

13. The cable and termination system of claim 12, wherein each phase conductor is Class B stranded has a gauge size ranging from #16 AWG to 1,000 Kcmil, and is insulated with cross-linked polyethylene XHHW-2 insulation, said jacket is selected from the group consisting of polyvinylchloride and polyolefin.

14. The cable and termination system of claim 12, wherein said braids are equally sized to collectively cover at least one-quarter of the circumference of the cable core, and are equidistantly spaced about the cable core.

* * * * *